United States Patent
Nwosu et al.

(10) Patent No.: US 6,701,698 B1
(45) Date of Patent: Mar. 9, 2004

(54) APPARATUS FOR FINE PULVERIZATION OF DRY LEAVES AND GARDEN DEBRIS

(76) Inventors: Michael U. Nwosu, 34 Oklahoma Trail, Hopatcong, NJ (US) 07843-1776; Eric S. Ndumele, 3 Crestview Ct., Montclair, NJ (US) 07042

( * ) Notice: Subject to any disclaimer, the term of this patent is extended or adjusted under 35 U.S.C. 154(b) by 0 days.

(21) Appl. No.: 10/340,456

(22) Filed: Jan. 10, 2003

(51) Int. Cl.$^7$ .............................................. A01D 75/00
(52) U.S. Cl. .................................. 56/16.4 D; 56/157
(58) Field of Search .................. 56/1, 157, DIG. 5, 56/16.4 D (56) References Cited

U.S. PATENT DOCUMENTS

| | | | |
|---|---|---|---|
| 2,647,694 A | 8/1953 | Williams et al. | 241/81 |
| 2,658,318 A | 11/1953 | Miller | 55/118 |
| 2,663,984 A | * 12/1953 | Clark | 56/13.7 |
| 2,706,372 A | 4/1955 | Blydenburgh | 56/25.4 |
| 2,984,961 A | 5/1961 | Judkins | 56/27 |
| 3,049,857 A | * 8/1962 | Shaw | 56/501 |
| 3,058,284 A | 10/1962 | Anderson | 56/25.4 |
| 3,688,479 A | 9/1972 | Martinson et al. | 56/13.2 |
| 3,790,094 A | 2/1974 | Spicer | 241/101.1 |
| 3,940,827 A | 3/1976 | Greco | 15/328 |
| 4,074,869 A | 2/1978 | Johnson | 241/55 |
| 4,117,983 A | 10/1978 | Browning | 241/55 |
| 4,214,713 A | 7/1980 | Wright | 241/57 |
| 4,875,630 A | 10/1989 | Carlson | 241/56 |
| 5,020,309 A | 6/1991 | Hopkins | 56/13.3 |
| 5,231,827 A | 8/1993 | Connolly et al. | 56/13.1 |
| 5,305,587 A | * 4/1994 | Johnson | 56/16.9 |
| 5,381,970 A | 1/1995 | Bold et al. | 241/55 |
| 5,435,118 A | * 7/1995 | Cobile | 56/13.4 |
| 5,707,017 A | 1/1998 | Paolucci et al. | 241/55 |
| 5,860,606 A | 1/1999 | Tiedeman et al. | 241/55 |

FOREIGN PATENT DOCUMENTS

| WO | WO 9834462 A1 | * 8/1998 | A01D/34/72 |
|---|---|---|---|

* cited by examiner

Primary Examiner—Thomas B. Will
Assistant Examiner—Meredith Petravick
(74) Attorney, Agent, or Firm—Ernest D. Buff and Associates, LLC; Ernest D. Buff; Mark J. Halvorson (57) ABSTRACT

An apparatus for finely pulverizing lawn debris has a central drive shaft driven by a gasoline or electrical power source. Lawn debris is drawn into a sucking chamber by a fan impeller blade mounted on the central drive shaft. The fan impeller blade initiates pulverization of the debris in the suction chamber. A grinding blade is mounted for rotation on the central drive shaft below the fan impeller blade. The grinding blade carries a plurality of blade elements operative to effect additional pulverization of the initially pulverized debris. A distributing plate mounted for rotation on the central shaft has a plurality of inclined apertures therein for dispensing a high velocity stream of the pulverized debris uniformly over said lawn.

3 Claims, 4 Drawing Sheets

FRONT VIEW   SIDE VIEW

Fig. 1

FRONT VIEW  SIDE VIEW

Section XX

APPARATUS FOR FINE PULVERIZATION OF DRY LEAVES AND GARDEN DEBRIS

BACKGROUND OF THE INVENTION

1. Field of the Invention

The present invention relates to leaf grinding apparatus; and more particularly, to a portable composer that automatically picks-up lawn debris, pulverizes it into a fine compostable powder, and distributes it uniformly over the lawn to enhance the appearance thereof and improve soil fertility.

2. Description of the Prior Art

Those responsible for maintenance of homes and commercial buildings have long struggled to devise a method and means for addressing the seemingly endless accumulation of garden refuse, such as leaves, sticks and debris on outside surfaces, including lawns, gardens, patios, walkways and the like. Numerous teachings relate to machinery adapted to pick up leaves and debris from outside surfaces, shred them into smaller particles, and redistribute the pulverized product into the soil. A wide variety of mechanisms feed garden refuse into the machinery, wherein it is reduced to small particles, bagged or otherwise disposed of.

U.S. Pat. No. 2,647,694 to Williams et al. discloses a leaf grinder apparatus comprising a vertical frame having a triangular base. An electric motor drives a pair of pulleys which turn a screw leaf feed and cutting blade mechanism. Leaves fed into a hopper are pushed against the screw feed, which delivers the leaves into a stationary-keyed disc. A plurality of arc-shaped apertures on the disc transport the leaves into cutting blades, which are driven by the electric motor. Leaves are fed manually into the hopper. An arc shaped leaf pusher feeds the leaves into the screw mechanism. The leaves pass once through a single cutting blade, which attempts to cut and shred them. Due to the manual feed and single cutting blade, particle size reduction of leaves and debris exiting the apparatus is oftentimes insufficient and non-uniform, causing uneven distribution thereof.

U.S. Pat. No. 2,658,318 to Miller et al discloses a suction leaf pickup wherein a single cutting centrifugal impeller blade propels the shredded leaves against a perforated cylinder. The perforated cylinder is disposed in the path of the shredded leaves and generally perpendicular to the shaft, which rotates the centrifugal impeller. Due to the perforations only those pulverized leaves which are small enough in size to be discharged exit the device. The exiting leaves move generally sideways in a direction perpendicular to the motion of the device. A discharge orifice through which the leaves exit is located high above the device so that it projects the pulverized leaves over the lawn or soil. Inasmuch as the single cutting blade must also function as a suction device, particle size reduction of the leaves and debris exiting the apparatus is inefficient and non-uniform. Perforations in the cylinder become clogged by large leaf fragments. This problem is not avoided by use of an elevated, low velocity discharge. Distribution pulverized leaves and debris is not accomplished in an efficient, reliable manner. The shredded leaves are too large and non-uniform for proper fertilization of lawn and garden soil.

U.S. Pat. No. 2,706,372 to Blydenburgh discloses a leaf grinder having a disk type blade containing additional leaf beating members. An expanded metal cylinder 44 is attached to the casting of the device. The beating members crush the leaves against the roughened portions or mesh produced by sharp edged multiple edges formed in the expanded metal. After being crushed the leaf particles pass out through the metal mesh. Pulverizing of dry leaves is solely accomplished by the leaf-beating and physical crushing against a sharp expanded metal rough surface forming a metal mesh in the sidewall casing through which the leaves pass. Leaf particles that are too large to pass through the metal mesh, become loosely attached thereto. The mesh becomes clogged, preventing proper discharge of ground leaf particles. Particle size reduction of leaves and debris is restricted and distribution of shredded garden refuse is non-uniform.

U.S. Pat. No. 2,984,961 to Judkins discloses a lawn cleaner and snow-clearing device. The device comprises a frame having a closed hood, a power source, a power supply support, a rotary drive shaft with a directly coupled cutting and suction blade and an orthogonal gear box with a blower fan blade. Grass is cut using a cutting and suction blade. The grass clipping and other lawn materials are drawn through the upper portion of the hood by the action of the suction blade. Lawn material is then drawn into the blower shaft by the blower fan. A blower shaft casing with perforations retains the lawn material in the blower shaft until the lawn material has been sufficiently pulverized by the blower fan. The pulverized lawn leaves exit the lawn cleaner through a blower outlet at the end of the blower shaft. In the Judkins device, leaves are drawn into the hood of the lawn cleaner by the grass-cutting blade. Pulverizing is accomplished by the interaction between a slowly rotating blower fan and a plurality of casing perforations, which retain and recycle larger uncut pieces of leaves. The blower outlet tends to become clogged by large fragments of uncut leaves. Garden refuse is discharged at low velocity from an elevated location, causing non-uniform distribution of shredded material over the lawn or soil.

U.S. Pat. No. 3,058,284 to Anderson discloses a lawn debris chopper comprising a mobile frame. Power is provided by a lawn mower gasoline engine connected to a cutting blade by direct drive. A drive belt is connected to a centrifugal blower and a chopper. The centrifugal blower receives an air stream carrying lawn material through a duct and passes it into a worm type feeding mechanism. Lawn material is extruded to a stationary perforated blade and a rotating cutting blade. Discharge of shredded lawn material is effected from a high location in a sideways direction generally perpendicular to the direction of motion of the lawn debris chopper. Due to the reduced speed of the cutting blade, cutting action is inefficient. Garden refuse is propelled at insufficient speed for uniform distribution. Stationary blade perforations arrange ground debris into a fine stream; but do not cut or chop the debris. Cutting is accomplished solely by the cutting blade, thereby limiting particle size reduction. The outlet port becomes clogged by oversize lawn debris from the suction blade. Distributed particles are often too large for proper lawn fertilization.

U.S. Pat. No. 3,688,479 to Martinson et al. discloses a leaf comminuting apparatus. The leaf commuting apparatus is connected to a lawn mower motor, which drives the cutting blades either by a direct connection or a belt drive. Cut blades of grass are drawn up, pulverized and discharged from an elevated location in a sideways direction generally perpendicular to the direction of lawn mower motion. The leaf commuting apparatus comprises a cylindrically shaped fan housing having an inlet opening and an outlet, a suction nozzle connected to the inlet opening, a fan mounted in the housing to provide suction at the inlet and a drive shaft connecting the fan to a motor. Commuting action is accomplished by close movement of movable blades affixed to the outer end of the blades of a fan, which interact with fixed blades attached to the walls the fan housing. A portion of the fan housing carries perforations through which an air stream passes. Finely chopped lawn clippings are carried away by the air stream, while pulverization of larger fragments is continued. Use of a suction fan to commute and transport the commuted lawn clippings causes clogging of the perforations. Suction is reduced and the apparatus can even stall when the device becomes completely plugged. Belt slippage is not infrequent. The elevated, low velocity air stream discharge results in non-uniform distribution of chopped clippings.

U.S. Pat. No. 3,790,094 to Spicer discloses a mobile leaf pulverizer comprising a mobile pick-up housing having wheels, an elongated blade and a power source. A separate pulverizer is connected to the power source through a belt drive. The housing includes an annular sidewall, a top wall having an outlet opening, and an annular lip providing a planar surface parallel to the plane containing the elongated blade. Rotation of the blade, which carries metal vanes oriented at a 45-degree angle constricted to operate between the housing sidewalls progressively draws leaves from the ground upward into the housing. The leaves move from the housing into the pulverizer where they are ground up by cutter blades therewithin. Pulverized leaves exit the pulverizer through slots in its housing. Leaves processed by the Spicer device are pulled up by the blade into the pick-up housing. The leaves are then forced into the pulverizer, where they are ground up using cutter blades and discharged from an elevated location. This discharge does not promote uniform distribution of the pulverized leaves. Moreover, use of a single power source to collect, transport and pulverize the leaves, leads to slow speed, inefficient pulverization. Disposition of power belt drive within the comminuting chamber permits large non-commuted leaves to clog the belt drive mechanism. The pulverizer stalls, and its lawn material processing efficiency decreases.

U.S. Pat. No. 3,940,827 to Greco discloses a leaf vacuuming attachment for conventional rotary lawn mowers. The attachment comprises a walled pan having a periphery that conforms to the lawn mower superstructure. When attached by clips, bolts and the like, the pan is below the lawn mower. This attachment encloses the casing of the lawn mower creating a vacuum by the rotation of the mower blade. A single input port is provided at one location on the peripheral wall of the attachment. Leaves are drawn into the chamber through a flexible hose when movement of the blade creates a vacuum in the chamber. The leaves are discharged in the usual manner into a grass catching bag a chamber outlet located about 180 degrees from the input port. No provision is made for leaf grinding; pick-up of leaves is accomplished by use of a flexible, manually directed hose. Leaf discharge is not finely pulverized. The collected leaves are not uniformly distributed and applied over the lawn.

U.S. Pat. No. 4,074,869 to Johnson discloses a vacuum blower-type mobile machine for shredding leaves and other garden debris. The machine comprises a housing frame, a motor for driving the drive shafts, and a reduced speed drive shaft geared to a high-speed horizontal main shaft using a planocentric type gear speed reducing arrangement. A first vertical rotor having six blades is mounted on the low speed drive shaft. The rotor functions as a vacuum blower drawing debris into the housing. A second vertical rotor having five cutting blades is mounted on the high-speed drive shaft axially aligned and closely spaced with the first rotor. Shredding action is accomplished in three discrete steps. (i) a stationary vane is placed in close proximity with the first rotating rotor shredding the debris as it enters the blower;. (ii) close spacing between the tailing edge of first rotor and the leading edge of the second rotor running at substantially increased rotational speed shreds debris by relative motion between the first and second rotor blades; and (iii) the close space between the trailing edge of the second rotor and the leading edge of a stationary exit-plate shreds debris as it leaves the machine. Shredded debris is collected in a bag. Changes in driving speed of the blower vanes and shredder vanes create a pressure difference across the unit. Gradual shredding of debris assures smooth flow of debris through the machine without clogging. This vertical rotor configuration of the first blower as well as the second high speed rotors results in a complicated mechanical arrangement. Gearing is required; the belt drive is located within a region in close contact with debris transported at high velocity. Such an arrangement causes gearing machinery and the associated belt drive to jam. No provision is made for uniform distribution of shredded debris, which is, instead, collected in a bag.

U.S. Pat. No. 4,117,983 to Browning discloses a leaf collector and comminutor having a collection receptacle. The device comprises a frame, spaced wheels supporting the frame, a gasoline or other motor, a drive shaft, and a hub carrying four rotating blades. Each blade is connected to three sets of leaf springs, which carry blade blocks with parallel side faces. The housing has three sets of locations along the periphery where leaf springs carry four sets of stationary shear bars with parallel faces. During operation the three blade blocks positioned on the rotating blade slide in between the spaces between four sets of shear bars create the comminutor processing action. If a stone or other large debris is encountered, the leaf springs flex, allowing easy passage of the stone and other debris. Leaves and other lawn material are drawn into the housing through a leaf pick up nozzle due to suction created by rotation of the blades. Once inside the housing the leaves are shredded through the action of the blade blocks and the shear bars. All debris processed by the comminutor is collected in a collection bin. Consequently, no provision is made for uniform distribution of processed debris over a lawn. Cutting is accomplished by shear action at the edges of rapidly rotating blocks mounted on rotating blades and edges of shear bars mounted on the periphery of the device. No means are provided for controlling the size of the debris during comminution. Comminution created by shear between anvils does not ensure production of uniformly sized pulverized debris. Passage of large debris such as stones and thick twigs, is facilitated by movement of leaf springs, shear bars and blade blocks away from each other.

U.S. Pat. No. 4,214,713 to Wright discloses a mobile lawn debris pulverizer that grinds up twigs and garden debris. The pulverizer comprises an internal combustion engine having a belt drive connected to the drive shaft of a centrifugal fan, which discharges pulverized debris into a collection bin in a trailer. The centrifugal fan unit creates negative pressure transporting pulverized debris from a pulverizing unit. Each of the centrifugal fan and the pulverizing unit is connected to the same shaft. Twigs, branches, and other material are fed into the inlet of the pulverizing unit by the negative pressure of the centrifugal fan. Pick-up is accomplished using a flexible nozzle of sufficient length so that rocks and stones have a chance to fall down. The housing of the pulverizing unit has a diverging frusto-conical inlet and a converging frusto-conical outlet, a main inlet blade opposite an entrance anvil, and a series of blades with oppositely placed anvils. These blades rotate within the cylinder and pulverize the debris. An entrance blade also serves to break up clumps of damp leaves and other lawn material. The twigs and branches are further shredded through the action of the blades in conjunction with their oppositely placed anvils. Shredded debris material exits the pulverizer through the outlet into the centrifugal fan's inlet. No provision is made for automatic pick-up of lawn debris. Pulverizing action by shear between anvils does not assure production of uniformly sized, pulverized product. The pulverized debris is collected in a bin; but not uniformly distributed over a lawn.

U.S. Pat. No. 4,875,630 to Carlson discloses a stationary leaf vacuum and shredder that uses a vacuum-hose to draw lawn material into the shredder for disintegration. The shredder comprises an external motor, a rotating shaft, a fan to create the required vacuum for transporting the vegetable debris, a shredding chamber with multiple loose whips, preferably made of stiff metal, attached to the rotating shaft. Leaves and other lawn material are drawn through a vacuum hose into the shredding chamber by negative pressure created by the rotating fan located therewithin. Lightweight lawn material is pulverized by contact with rotating loose whips, while rocks and other hard lawn material are deflected by the rotating loose whips and are not pulverized. The fan discharges the pulverized lawn material and deflected rock and other hard lawn material through a discharge chute. Since only the fan creates suction, all debris has to be transported by the negative fan-created pressure. This arrangement leads to a slow, tedious process. The lawn debris is not picked-up automatically. Shredding action depends on repeated contact between the loose whip elements and the vegetable matter, causing unpredictability and a non-uniformly sized shredded product. Shredded debris discharged through an exit nozzle using the same fan is not uniformly distributed over the lawn.

U.S. Pat. No. 5,020,309 to Hopkins discloses a leaf shredder attachment device for a mower bagging system. The leaf shredder attachment device is powered by an electrical motor. It uses rigid cutters or string elements to further shred grass and other lawn debris which, after shredding, is collected and bagged. The device is located within the discharge conduit of the lawn machine between the primary cutter and the bagging unit. After passing through the leaf-shredding device, the lawn material is deposited into a catcher. The leaf shredder device can also be attached to a hand-held leaf vacuum. Leaves are forced into the leaf shredder through the action of a mower cutting blade or from a vacuum created by a hand-held leaf vacuum. Separate electrical power is required to shred lawn debris. The motor powering the shredder unit is totally encompassed by the debris flow. Plugging of bearings and critical components is not unlikely, since motors depend on air flow to cool windings and the like. No means are provided to assure that the shredded debris is uniformly sized. The shredded lawn material is stored in the bagging unit, and not uniformly distributed over the lawn.

U.S. Pat. No. 5,231,827 to Connolly et al. discloses a lawn and garden apparatus that can be used to collect and shred debris as well as chipping branches. The apparatus comprises a wheel-supported housing having a substantially closed work chamber, a drive shaft connected to a gasoline-powered engine and a solid disc mounted on the drive shaft. The disk has four downwardly extending air moving and beating blades that create a negative pressure forcing leaves and other lawn material through an inlet chamber into the work chamber. After being shredded, the lawn material is forced out of the work chamber through an exit opening by the air moving blades. An outlet screen prevents larger material from passing through the exit opening. In addition to shredding, the apparatus is capable of chipping branches. The chipped branches are fed through a chute. A sharpened blade, found on the trailing edge of a slotted disc, is used to perform chipping and branching operations. All the debris shredded is passed to a collection bag or deflected through a nozzle. Shredding action is accomplished rotating air-moving blades. Leaves and other material appointed for pulverization do not circulate inside the cylindrical frame. Consequently, the small screen often becomes clogged with large non-pulverized debris. The device has as its principle objective the collection and bagging of shredded debris. Projection of shredded debris through a nozzle results in non-uniform distribution of pulverized product over the lawn.

U.S. Pat. No. 5,381,970 to Bold et al. discloses a combination chipper/shredder and vacuum unit for lawns and gardens. The apparatus comprises a housing containing a frame on which single motor is mounted. Enclosed within the housing is a flat plate-like disc. A plurality of fan blades are attached to one face of the disc, and an aperture extends adjacent to a chipper blade. The disc is coupled to a drive shaft and rotates about a horizontal axis perpendicular to the unit's direction of movement. An inlet is aligned with the chipper blade so that the bottom edge of the inlet forms an anvil against which the chipping action takes place. As the disk rotates, limbs and other lawn material are manually inserted into the chipper inlet; and are reduced to small pieces through the action of the chipper blade. The material is then forced through a plurality of apertures provided by a screen, and collected in a bag. For shredding smaller material, a vacuum created by the fan blades draws leaves and other lawn material into the disc, whereon it is shredded. The shredded material is then passed through a generally cylindrical screen and collected in a bag. In this device, larger materials are manually placed into an inlet of the device, and are not automatically picked up. However, leaves and other smaller lawn materials are drawn into the apparatus though the action of fan blades located in the disk. These smaller lawn materials are shredded by the fan action, which is inefficient since the fan does not have cutting blades. Coarse shredded material exiting the apparatus and tends to clog the screen. No provision is made for controlling the size of shredded debris; and no mechanism is provided for uniform distribution of the shredded material over a lawn.

U.S. Pat. No. 5,707,017 to Paolucci et al. discloses a combination blower, comminuting vacuum, and wood chipper. The apparatus comprises an impeller housing having an inlet opening and an outlet opening. An impeller is mounted on a drive shaft located within the housing. The impeller includes a backing plate having radially extending blades fixed to one face thereof. Each of the impeller blades has back edges, bent perpendicular to its leading face, with serrated teeth for shredding the leaves and other lawn material. The impeller, with the cooperation of the volute shape of the peripheral wall, forces air in from the inlet opening. After traversing the housing, the air passes out through the outlet opening. Lawn material are forced into the housing through the action of the impeller. Once inside the housing, the lawn material is cut into pieces by the shredder before exiting the housing through the outlet opening. Attached to the inner face of a peripheral wall of the housing and extending radially outward from the impeller is a stator having serrated teeth. The stator further shreds material as it passes through the housing. During operation of device, the impeller unidirectionally forces leaves and other lawn material through the housing, where the materials are shredded by the cutter and stator. Lawn material appointed for shredding does not circulate inside the cylindrical frame. Rather, shredding of the lawn debris is restricted, occurring only for that time required for passage of the debris through the impeller. Shredded material exits the device after being comminuted during a restricted residence time, governed by passage through the impeller. There exists no mechanism for preventing incompletely shredded lawn debris from clogging up the outlet opening. Discharge of shredded material occurs through a chute, and is, optionally, collected in a bag or left on the lawn. Debris is not shredded uniformly; and no provision exists for uniform distribution of shredded debris over the lawn.

U.S. Pat. No. 5,860,606 to Tiederman et al. discloses a chipper/shredder for comminuting debris such as leaves branches, and other lawn material. The chipper/shredder comprises a housing having a feed chute attached to the front side and a chipper chute secured to the rear side. The feed chute can rotate between an upright position and a lowered position. In the lowered position the user can rake leaves and other lawn debris into the interior of the housing through the chute. In the upright position, the user can place branches and other materials directly into the chute. The chipper/shredder further comprises cutting elements contained within the housing and an engine operatively coupled to the cutting elements for shredding the leaves, branches and other debris that have been inserted. All material feeding to this device has to be done manually. No provision is made for automatic pick-up of lawn debris. Shredded material exits the device through a chipper chute. There exists no mechanism in the device that exerts quality control over the size of comminuted particles, so as to prevent incompletely shredded lawn debris from clogging up the chipper chute.

There remains a need in the art for a garden device that produces uniformly sized pulverized dry leaves especially suited to form humus mulch, and distributes the pulverized dry leaf product uniformly over a lawn to enhance its appearance and improve soil fertility through increased organic matter content. Also needed is a garden device that is lightweight, compact, easy to maneuver, inexpensive to construct and reliable in operation; the use of which reduces the amount of raked leaves and grasses accumulating in landfills.

SUMMARY OF THE INVENTION

The present invention provides a lawn debris composter that is lightweight, mobile, inexpensive to construct and highly reliable in operation. When deployed over grassy areas contiguous residential and commercial buildings, the composter automatically draws leaves, sticks, grass and other garden refuse into a comminuting chamber, pulverizes it into small evenly sized particles, which are distributed uniformly over the lawn. Soil fertility is enhanced by addition of organic matter, and the amount of raked leaves and grasses accumulating in landfills is reduced.

Generally stated, there is provided a composter for finely pulverizing lawn debris. The composter has a central drive shaft driven by a gasoline or electrical power source. Lawn debris is drawn into a sucking chamber by a fan impeller blade mounted on the central drive shaft. The fan impeller blade initiates pulverization of the debris in the suction chamber. A grinding blade is mounted for rotation on the central drive shaft below the fan impeller blade. The grinding blade carries a plurality of blade elements operative to effect additional pulverization of the initially pulverized debris. A distributing plate mounted for rotation on the central drive shaft has a plurality of inclined apertures therein for dispensing a high velocity stream of the pulverized debris uniformly over said lawn.

More specifically, the present invention provides a motorized, mobile lawn and garden machine that picks up leaves and debris from the lawn, grinds them into a fine uniform powder, and re-distributes the powder uniformly into the lawn. The motorized machine picks up leaves through a suction hood located at its front portion. Leaf transport is accomplished by negative pressure. A fan having a plurality of impeller blades is connected to a motor drive and positioned within a suction and grinding chamber. Suction created by rotation of the fan impeller blades produces the negative pressure. A rotating air flow generated by fan impeller blade motion, moves downward within the suction and grinding chamber. Interaction between the entrained dry leaves and rapidly rotating fan impeller blades creates an initial pulverizing action. An air stream carries the initially pulverized leaves to a plurality of rotating grinding blades mounted on the same drive shaft as and positioned directly below the fan impeller blades. The rotating grinding blades typically consist of alternating sets of four fan blades and four knife-edge blades designed to grind up the dried leaves as they circulate within the chamber. The space between the fan impeller blades and the rotating grinding blades is selected so that the leaves carried in the air stream are caused to undergo a substantially velocity reduction. Impact between the leaves and the rotating grinding blades creates further pulverization. Following second state pulverization, the air stream together with the pulverized leaves is propelled vertically downwards in a rotating flow field. The downwardly directed rotating air stream is thereby brought into contact with a rotating distribution plate, located directly below the rotating grinding blade and attached to the same drive shaft. The rotating distributing plate has uniformly sized apertures to allow the air stream carrying pulverized, uniformly sized debris to be dispensed at a high velocity. A significant increase in air stream velocity results from centrifugal forces imparted by rotation of the distribution plane, together with air stream pressure. The apertures are angled to prevent build up of debris around their edges and to ensure smooth flow of the air stream with pulverized debris. Debris particles too large to pass through the apertures are returned back to the fan impeller blades for additional pulverization. Substantial back-pressure created in the plate area where no apertures are present, combined with negative pressure created by the fan impeller blades, redirects these larger particles back through the rotating grinding blades.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Grass and garden debris including dry leaves are commonly raked and disposed of in landfills. In order for the lawn or soil to absorb the organic content of the cut grass clippings and dry leaves as humus, there are specific requirements as to particle size and uniformity of distribution. Large quantities of debris, when non-uniformly applied over a lawn, choke or smother grasses and do not decompose quickly enough to provide nutrient value.

The present invention provides a lawn and garden machine, or composter, that picks up leaves and debris from the lawn or field, grinds them into a powder, and re-distributes the pulverized powder into the soil.

Figure 1:
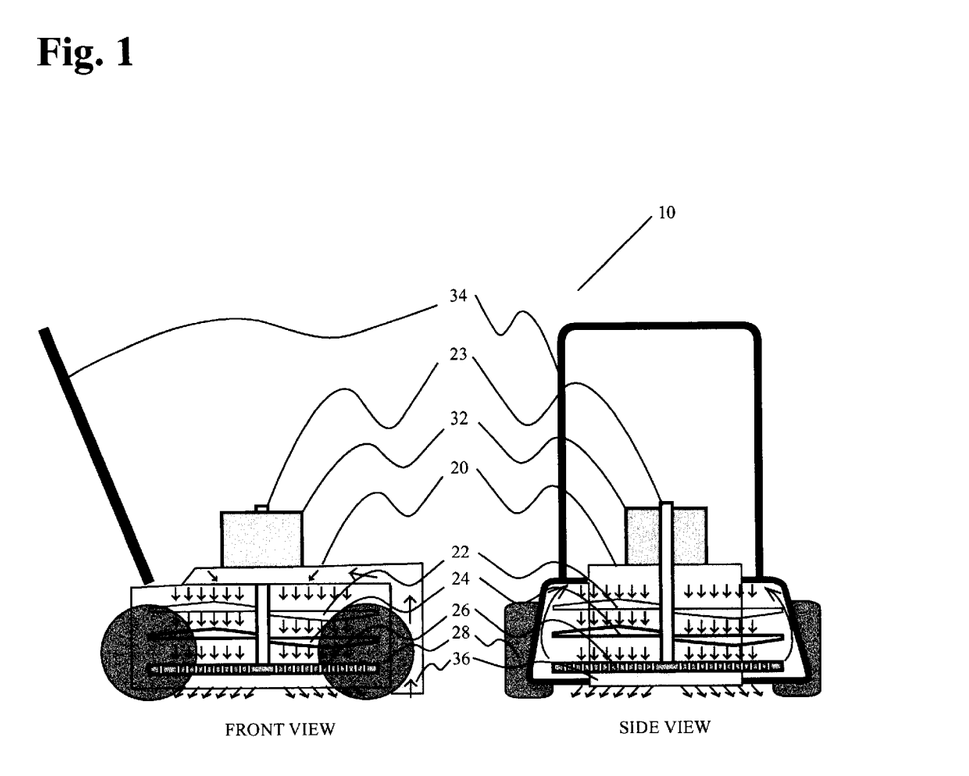
FIG. 1 is a schematic diagram illustrating the apparatus for pulverizing dry leaves and uniformly distributing it on the lawn or soil.

Referring to FIG. 1 of the drawings, there is illustrated schematically, a composter 10 mounted on transportation wheels 28 and is pushed by handle 34 in the manner of a lawn mower, lime spreader or the like. The machine has a power source comprised of a gasoline engine or electrical motor 32 connected to drive shaft 23. The machine picks up leaves through a suction hood 36 located at the front of the device. Pick-up is accomplished by negative pressure generated from the rotation of fan impeller blades 22. In the embodiment shown, the fan impeller comprises four blade elements attached to drive shaft 23. Upon rotation of the fan impeller blades 22, suction is created within the suction and grinding chamber 20 attached to suction hood 36. Lawn debris is drawn into this chamber with a nearly vertical flow pattern. The lawn debris enters the suction and grinding chamber 20, being entrained by the air stream created by the fan impeller blades. During movement, the air stream and entrained debris tend to follow the flow patterns shown in FIG. 1. The fan impeller blades impact the entrained debris initiating pulverization thereof.

Figure 2:
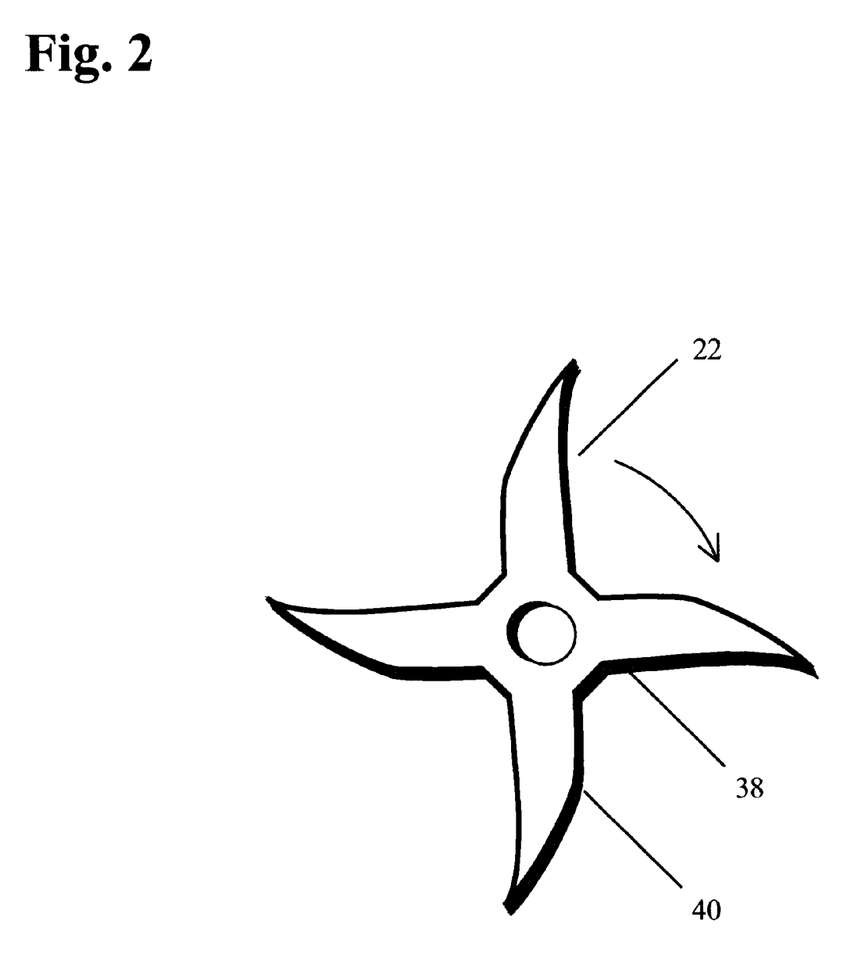
FIG. 2 is a schematic diagram depicting the fan impeller blade.

In FIG. 2 the construction of the fan impeller 22 is schematically shown. The fan impeller shown contains four blade elements pitched to drive air stream in a downward direction when the fan impeller blade is rotated in the direction shown by the arrow. Preferably, the fan impeller blade contains from 2 to 6 blade elements, the blade number being governed by design details. The blades are pitched to drive an air stream carrying the lawn debris downwards when rotated as indicated in FIG. 1. Each blade has a sharp edge 38 and a blunt edge 40, as shown in FIG. 2. The air stream flow has rapid circular rotational motion as well as a downward flow pattern and subsequently carries these pulverized leaves with a rotating vertical downward flow into a plurality of rotating grinding blades 24.

Figure 3:
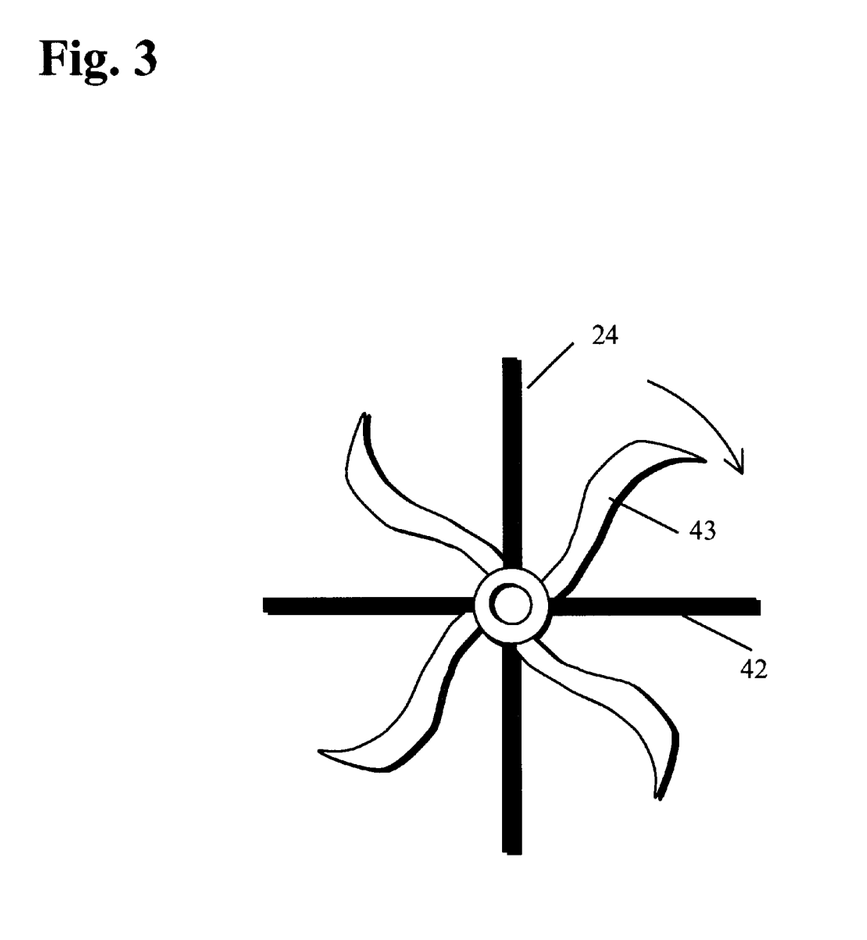
FIG. 3 is a schematic diagram depicting the rotating grinding blade.

FIG. 3 illustrates the design of rotating grinding blades 24. Each of the grinding blades 24 consists of alternating sets of four fan blades 43 and four knife-edge blades 42 designed to grind up the dried lawn debris as it circulates in the chamber. Preferably, the rotating grinding blade contains from about 2 to 6 fan blades and about 2 to 6 knife edge blades depending on design considerations. Each of the rotating grinding blade sets is attached to the same drive shaft. With this arrangement, the grinding blade sets are driven at the same rotational speed as the fan impeller; but have a substantially higher pulverizing and grinding capability due to the increased number of blade elements contained.

In addition, the vertical spacing between the fan impeller blades and rotating grinding blades is selected so that initially pulverized debris carried in the air stream has a sufficient time interval with which to slow down after exiting the fan impeller blades. With this arrangement, the initially pulverized debris carried by the air stream impact the rotating grinding blades at significantly higher impact velocities, thereby creating further pulverization. Preferably, the distance between the fan impeller blades and the rotating grinding blades is about 2 to 8 inches, and most preferably 4 inches. The overall airflow for the entrained pulverized leaves is generally vertically downwards and rational, since rotational movement of the air stream follows the rotational direction of the fan impeller blades and the rotating grinding blades, as shown by the arrows in FIG. 1. The powdered leaves carried in the air stream are then forced onto the rotating distributing plate 26, which is located below the rotating grinding blades. This plate has a number of sized holes designed to allow leaves ground to specific particle sizes to escape with the air stream discharge into the lawn.

Figure 4:
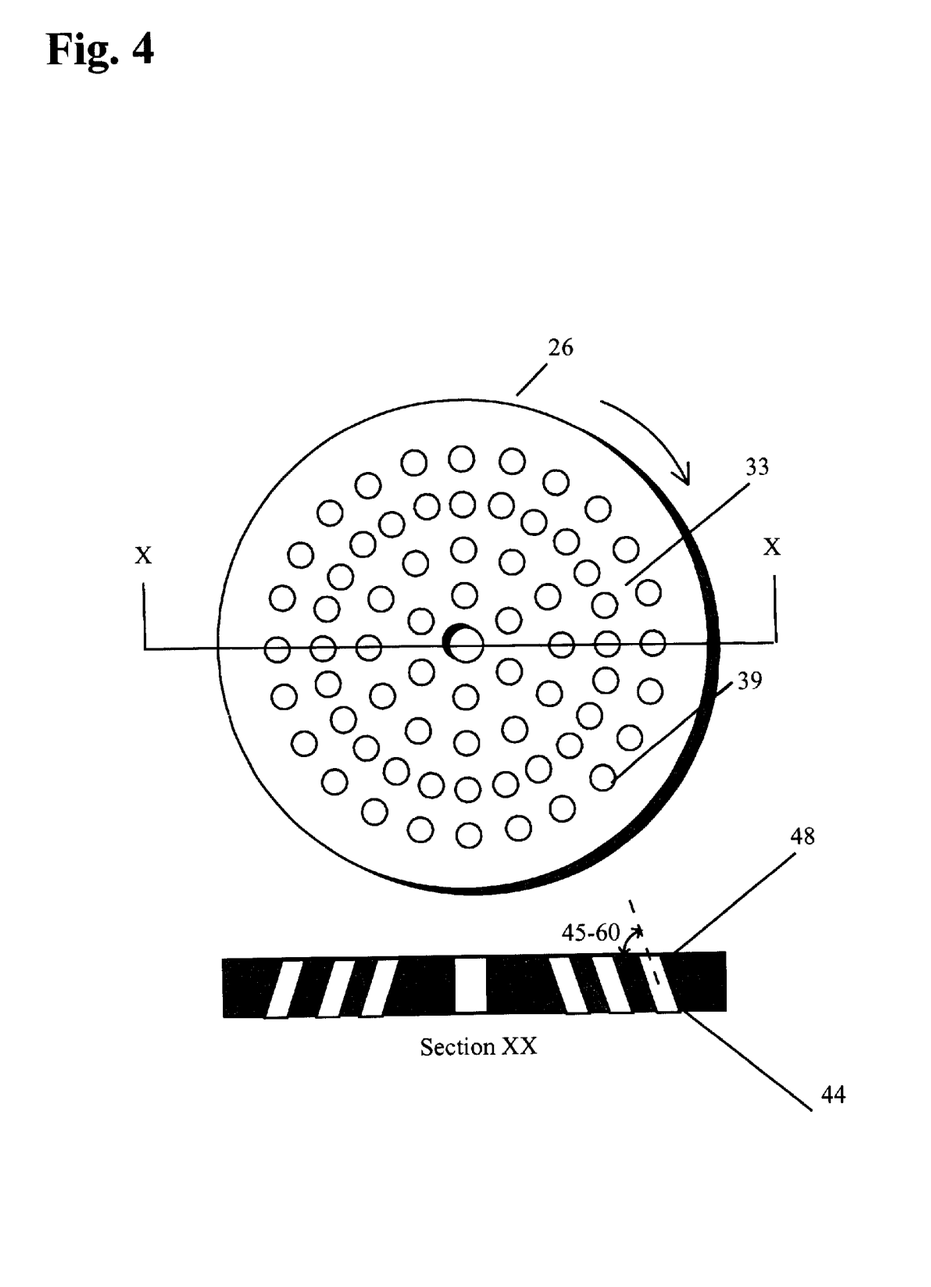
FIG. 4 is a schematic diagram representing the rotating distributing plate with inclined holes.

In FIG. 4 various details of the rotating distributing plate 26 are illustrated. The rotating distributing plate is attached to drive shaft 23. Its top and bottom surfaces are shown at 44 and 48, respectively. Bottom surface 44 is preferably separated from the ground therebeneath by a distance of about 2 to 6 inches, more preferably 4 inches, to prevent impact with rocks and other hard material present on the lawn. This clearance also provides sufficient distance for discharge of the air stream carrying pulverized material forcefully into the lawn. Distributing plate 26 imparts centrifugal forces to the pulverized debris and facilitates its high velocity exit from the rotating distribution plate as well as its uniform distribution over the lawn. Apertures 39 in distributing plate 26 are uniquely bored at an angle ranging from about 60° to 45° inclined generally radially outward in the direction of plate rotation. That is to say, apertures 39 are inclined in both the radial outward direction and along the direction of rotation to smoothly carry the air flow and the pulverized debris, without excessive deposition of pulverized material around the edges of the apertures. In an alternate embodiment, illustrated by cross-section XX of FIG. 4, the apertures are inclined along the radial outward direction solely. These uniformly sized apertures govern the size of the pulverized dry leaves, assuring that the reduced particles have a substantially uniform size. Larger sized debris particles, which are insufficiently pulverized, are returned back to the fan impeller blades. Return of these particles is facilitated by portions 33 of distributing plate 26 that do not contain apertures 39. These portions 33 tend to block the air flow, allowing entrained particles therein to be pushed back toward the suction and grinding chamber. The vacuum suction of the fan impeller blades pulls these larger sized particles along the flow path shown in FIG. 1, causing them to reenter the suction and grinding chamber, wherein they receive additional pulverization. High velocity discharge of debris entrained within the air stream assures substantially uniform distribution of pulverized debris over the lawn or soil without undue buildup.

Since the fan impeller blades 22, grinding blades 24 and distributing plate 26 are all connected to the same drive shaft and rotate at the same speed, the composter requires no belts or gears which, if present, would likely become clogged by pulverized debris. An external single power source comprised of an electrical motor or gasoline engine powers the drive shaft. Energy is conserved and efficiency enhanced, since no power is lost in gear drives or belt drives subject to belt slipping. Changing the speed of the drive shaft provides different levels of suction and leaf pulverization, as well as the capability for distribution of pulverized debris.

Since the suction hood is vertical and about the same height as the suction and grinding chamber, the leaves have to be picked-up substantial distances before entering the suction chamber. Heavier objects such as stones are not readily raised to this height by the negative suction pressure, causing impeller blade contact with such objects to be substantially avoided. Reliability of the composter is improved and its in service life is prolonged.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An apparatus for finely pulverizing lawn debris, comprising:
   a. a frame having attached thereto a suction hood, a suction and grinding chamber and a plurality of transportation wheels;
   b. a power source mounted on the suction and grinding chamber and operably connected to a central drive shaft to provide power for pulverization and distribution of said debris;
   c. a fan impeller blade mounted on the central drive shaft for drawing the dry leaves through the suction hood and effecting initial pulverization of said debris;
   d. a grinding blade mounted for rotation on said central shaft for effecting further pulverization of said initially pulverized debris: and
   e. a distributing plate mounted for rotation on said central shaft said distributing plate having a plurality of inclined apertures therein for dispensing a high velocity stream of said pulverized debris uniformly over said lawn, said apertures extending from a top surface to a bottom surface of said plate, and being inclined at an angle ranging from 45 to 60 degrees with respect to said top surface.

2. An apparatus for finely pulverizing of lawn debris as recited by claim 1, wherein the said angle of inclination of said apertures extends generally radially outward and along the direction of plate rotation.

3. An apparatus for finely pulverizing lawn debris as recited by claim 1, wherein the said angle of inclination of said apertures extends generally radially outward.

* * * * *